（12）United States Patent
Nitta

(10) Patent No.: US 9,025,168 B2
(45) Date of Patent: May 5, 2015

(54) INFORMATION PROCESSING DEVICE AND IMAGE FORMING APPARATUS

(75) Inventor: Ryuichi Nitta, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 406 days.

(21) Appl. No.: 13/404,661

(22) Filed: Feb. 24, 2012

(65) Prior Publication Data

US 2012/0218584 A1 Aug. 30, 2012

(30) Foreign Application Priority Data

Feb. 28, 2011 (JP) ................................. 2011-041415

(51) Int. Cl.
*G06F 3/12* (2006.01)
*G06F 3/01* (2006.01)
*G06F 3/033* (2013.01)
*H04B 1/38* (2006.01)
*G03G 15/00* (2006.01)
*G06F 3/0488* (2013.01)

(52) U.S. Cl.
CPC .......... *G03G 15/502* (2013.01); *G06F 3/04883* (2013.01)

(58) Field of Classification Search
None
See application file for complete search history.

(56) References Cited

U.S. PATENT DOCUMENTS

| 7,631,274 | B2 | 12/2009 | Kumagai et al. | |
|---|---|---|---|---|
| 2006/0020900 | A1 | 1/2006 | Kumagai et al. | |
| 2006/0250376 | A1 | 11/2006 | Takahashi | |
| 2009/0265670 | A1* | 10/2009 | Kim et al. | 715/863 |
| 2009/0267907 | A1 | 10/2009 | Noma | |
| 2010/0241957 | A1* | 9/2010 | Kim et al. | 715/702 |
| 2010/0333044 | A1* | 12/2010 | Kethireddy | 715/863 |

FOREIGN PATENT DOCUMENTS

| JP | 10-303931 A | 11/1998 |
|---|---|---|
| JP | H11-149563 A | 6/1999 |
| JP | 2002-311820 A | 10/2002 |
| JP | 2006-031560 A | 2/2006 |
| JP | 2006-338488 A | 12/2006 |
| JP | 2008-077272 A | 4/2008 |
| JP | 2009266127 A | 11/2009 |
| JP | 2010-049654 A | 3/2010 |
| JP | 2010-266937 A | 11/2010 |
| WO | 2010013876 A1 | 2/2010 |

OTHER PUBLICATIONS

English Machine translation of JP 2009-266127.

(Continued)

*Primary Examiner* — Miya J Cato
*Assistant Examiner* — Temitayo Folayan
(74) *Attorney, Agent, or Firm* — Knobbe Martens Olson & Bear LLP

(57) ABSTRACT

An information processing device includes: a display portion that can display a plurality of icons including first information; a detection portion that detects a contact to the display portion; and a control unit that, in a case in which the detection portion detects a contact having a trajectory encircling at least one icon displayed on the display portion in a state in which the icons are displayed on the display portion in a first display mode, displays the at least one icon in a second display mode with a greater display area and displays the at least one icon in a central region of the display portion.

4 Claims, 12 Drawing Sheets

(56) References Cited

OTHER PUBLICATIONS

Communication from foreign (Japanese) patent office for a counterpart foreign application, dated Jun. 11, 2013.

Notice of Reasons for Rejection issued to JP Application No. 2013-159027 mailed Feb. 12, 2014.

Decision of Refusal issued to JP Application No. 2013-159027, mailed Nov. 4, 2014.

* cited by examiner

FIG. 3

| ORDER | ICON INFORMATION |
|---|---|
| 1 | MAGNIFICATION |
| 2 | DUPLEX |
| 3 | DENSITY |
| ⋮ | ⋮ |

INFORMATION PROCESSING DEVICE AND IMAGE FORMING APPARATUS

This application is based on and claims the benefit of priority from Japanese Patent Application No. 2011-041415, filed on 28 Feb. 2011, the content of which is incorporated herein by reference.

BACKGROUND

The present disclosure relates to an information processing device that enlarges and reduces an image displayed on a display portion and an image forming apparatus that is provided with the information processing device.

An information processing device is known that is provided with a touch screen composed of: a display portion that displays an image; and a detection portion that detects contact by an object to the display portion. Such an information processing device is known that enlarges an image displayed on the display portion if a circle is drawn in a clockwise direction by a user's finger in contact with the display portion; and reduces the image displayed on the display portion if a circle is drawn in a counterclockwise direction by the user's finger (Related Art 1).

However, Related Art 1 discloses only enlargement and reduction of an entire image displayed on the display portion and does not disclose enlargement and reduction of only a part of an image (for example, a specific icon) that interests a user.

SUMMARY

The present disclosure is aimed at providing an information processing device that can switch display modes of icons specified by a user.

In addition, the present disclosure is aimed at providing an image forming apparatus provided with the information processing device.

The present disclosure is related to an information processing device including: a display portion that can display a plurality of icons including first information; a detection portion that detects a contact to the display portion; and a control unit that, in a case in which the detection portion detects a contact having a trajectory encircling at least one icon displayed on the display portion in a state in which the icons are displayed on the display portion in a first display mode, displays the at least one icon in a second display mode with a greater display area and displays the at least one icon in a central region of the display portion.

The present disclosure is also related to an information processing device including: a display portion that can display a plurality of icons including first information; a detection portion that detects a contact to the display portion; a control unit that, in a case in which the detection portion detects a contact having a trajectory encircling at least one icon displayed on the display portion in a state in which the icons are displayed on the display portion in a first display mode, displays other icons in a second display mode with a greater display area and displays the at least one icon in a third display mode with a smaller display area on the display portion.

The present disclosure is also related to an information processing device including: a display portion that can display a plurality of icons including first information; a detection portion that detects a contact to the display portion; a storage unit that stores order information that associates information relating to an icon to be displayed on the display portion and an order of displaying icons on the display portion; and a control unit that, in a case in which the detection portion detects a contact having a trajectory encircling at least one icon displayed on the display portion in a state in which the icons are displayed on the display portion in a first display mode, deletes the at least one icon from the display portion and displays a predetermined icon additionally on the display portion based on the order information stored in the storage unit.

The present disclosure is also related to an image forming apparatus provided with the abovementioned information processing device.

BRIEF DESCRIPTION OF THE DRAWINGS

FIG. 3 is a diagram explaining order information stored in a storage unit;

DETAILED DESCRIPTION

Figure 1:
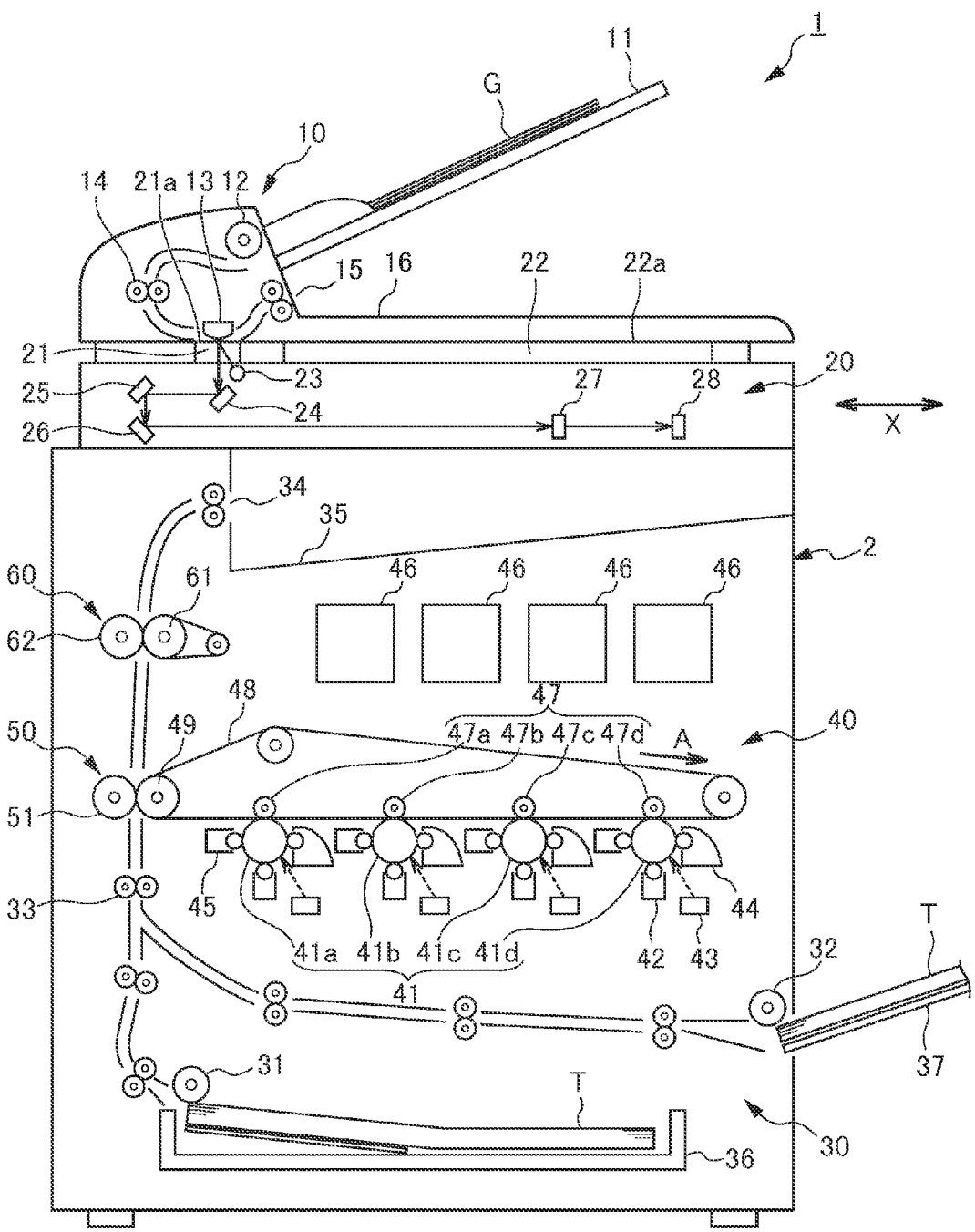
FIG. 1 is a diagram illustrating an overall configuration of a copy machine.

An embodiment of the information processing device of the present disclosure is described hereinafter with reference to the drawings. In the present embodiment, a configuration in which an information processing device is installed in a copy machine as an example of the image forming apparatus is described. First, the copy machine is described hereinafter. FIG. 1 is a diagram illustrating an overall configuration of a copy machine.

The copy machine 1 includes an original conveying unit 10, an original reading unit 20, and a sheet conveying unit 30, an image forming unit 40, a transfer unit 50, and a fixing unit 60.

The original conveying unit 10 is composed by an ADF (automatic document feeder), and includes an original mounting unit 11, a first feed roller 12, a guide 13, a timing roller pair 14, and an original discharge unit 15. The first feed roller 12 supplies an original G mounted on the original mounting unit 11 in order of single sheets to the timing roller pair 14. The timing roller pair 14 conveys the original G or stops the conveyance of the original G in order to make the timing of the reading of an image of the original G by the original reading unit 20 coincide with the timing of supplying the original G to the position for reading of the image of the original G by the original reading unit 20 (position at which the guide 13 is disposed). The guide 13 introduces the conveyed original G to a first reading surface 21a (described later). The original discharge unit 15 discharges an original G of which image if read by the original reading unit 20 (passed through the guide 13) to the outside of the copy machine main body 2.

An original accumulation unit 16 is formed on an outer side of the copy machine main body 2 in the original discharge unit 15. An original G discharged from the original discharge unit 15 is stacked and collected in the original accumulation unit 16.

The original reading unit 20 includes a first reading surface 21a and a second reading surface 22a. The first reading surface 21a is formed along the upper surface of a first contact glass 21 disposed facing the guide 13, and forms the reading surface for reading an image of the original G. The second reading surface 22a is disposed adjacently to the first reading surface 21a (as shown in FIG. 1, along the majority of the right side of the first reading surface 21a). The second reading surface 22a is used for reading an image of the original G without using the original conveying unit 10. The second reading surface 22a is formed along the upper surface of a second contact glass 22 mounting the original G, and forms the reading surface for reading an image of the original G.

The original reading unit 20 includes an illumination unit 23, a first mirror 24, a second mirror 25, a third mirror 26, an imaging lens 27, and an image capture unit 28, that are provided in an inner portion of the copy machine main body 2. The illumination unit 23 and the first mirror 24 are disposed respectively in a sub-scanning direction X. The second mirror 25 and the third mirror 26 are disposed on the left side of the illumination unit 23 and the first mirror 24 in FIG. 1. Furthermore, the second mirror 25 and the third mirror 26 respectively displace in the sub-scanning direction X while maintaining a fixed distance (optical path length) from the first reading surface 21a or the second reading surface 22a to the image capture unit 28, the distance passing through the first mirror 24, the second mirror 25, the third mirror 26, and the imaging lens 27.

The illumination unit 23 is a light source that illuminates light onto the original G. The first mirror 24, the second mirror 25, and the third mirror 26 are mirrors that maintain a fixed optical path length while introducing light reflected by the original G to the imaging lens 27. The imaging lens 27 images light that is incident from the third mirror 26 onto the image capture unit 28. The image capture unit 28 is an image sensor for obtaining image data based on a focused light image by converting the incident light to an electrical signal, and for example may be a charge coupled device (CCD) or complementary metal oxide semiconductor (CMOS).

The sheet conveying unit 30 includes a second feed roller 31, a third feed roller 32, a registration roller pair 33, and a sheet discharge unit 34. The second feed roller 31 supplies paper T (transfer medium) contained in the sheet cassette 36 to the transfer unit 50. The third feed roller 32 supplies paper T (transfer medium) mounted on the manual feed tray 37 to the transfer unit 50. The registration roller pair 33 conveys the paper sheet T or stops the conveyance of the paper sheet T in order to make the timing of the forming of a toner image on the transfer unit 50 coincide with the timing of supplying the paper sheet T to the transfer unit 50. The registration roller pair 33 corrects skew (inclination of the supplied paper) of the paper T. The sheet discharge unit 34 discharges the paper T having a toner image fixed thereto to the outside of the copy machine main body 2.

A discharged sheet accumulation unit 35 is formed on an outer side of the copy machine main body 2 in the sheet discharge unit 34. The paper T discharged from the sheet discharge unit 34 is stacked and collected in the discharged sheet accumulation unit 35.

The image forming unit 40 includes a photosensitive drum 41, a charging member 42, a laser scanning unit 43, a developing unit 44, a cleaning unit 45, a toner cartridge 46, a primary transfer roller 47, an intermediate transfer belt 48, and a counter roller 49.

The photosensitive drum 41 (41a, 41b, 41c, 41d) functions as a photosensitive body or an image supporting body to form respective toner images from black, cyan, magenta and yellow. The charging member 42, a laser scanner unit 43, a developing unit 44, and a cleaning unit 45 are disposed in order from upstream to downstream along the rotation direction of the photosensitive drum 41 in the periphery of each photosensitive drum 41a, 41b, 41c, and 41d. The charging member 42 applies a charge to the surface of the photosensitive drum 41. The laser scanning unit 43 is disposed at a distance from the surface of the photosensitive drum 41, and the surface of the photosensitive drum 41 is scanned and exposed based on the image data related to the original G that is read by the original reading unit 20. In this manner, a charge on the exposed portion on the surface of the photosensitive drum 41 is removed to thereby form an electrostatic latent image. The developing unit 44 attaches toner to the electrostatic latent image formed on the surface of the photosensitive drum 41 to thereby form a toner image. After the static charge is removed from the surface of the photosensitive drum 41 by a charge removal device (not shown), the cleaning unit 45 removes residual toner from the surface.

The toner cartridge 46 contains respective colors of toner supplied to the developing unit 44. The toner cartridge 46 and the developing unit 44 are connected by a toner supply passage (not shown).

The primary transfer rollers 47 (47a, 47b, 47c, 47d) are respectively disposed opposite each photosensitive drum 41a, 41b, 41c, 41d in the intermediate transfer belt 48. The intermediate transfer belt 48 is a belt passing through the image forming unit 40 and the transfer unit 50. A part of the intermediate transfer belt 48 is sandwiched between each photosensitive drum 41a, 41b, 41c, 41d and each primary transfer roller 47a, 47b, 47c, 47d, to thereby primarily transfer the toner image formed on the surface of each photosensitive drum 41a, 41b, 41c, and 41d. The counter roller 49 is a drive roller disposed on an inner side of the annular intermediate transfer belt 48, and propels the intermediate transfer belt 48 in the direction of an arrow A shown in FIG. 1.

The transfer unit 50 includes a secondary transfer roller 51. The secondary transfer roller 51 is disposed opposite the counter roller 49 in the intermediate transfer belt 48 and sandwiches a portion of the intermediate transfer belt 48 with the counter roller 49. The secondary transfer roller 51 executes secondary transfer onto the paper sheet T of the toner image that has been subjected to primary transfer on the intermediate transfer belt 48.

The fixing unit 60 includes a heating rotational member 61 and a pressuring rotational member 62. The heating rotational member 61 and the pressuring rotational member 62 sandwich the paper sheet T that includes the secondary-transfer toner image, to thereby melt and pressurize the toner, and fix that toner onto the paper sheet T.

Figure 2:
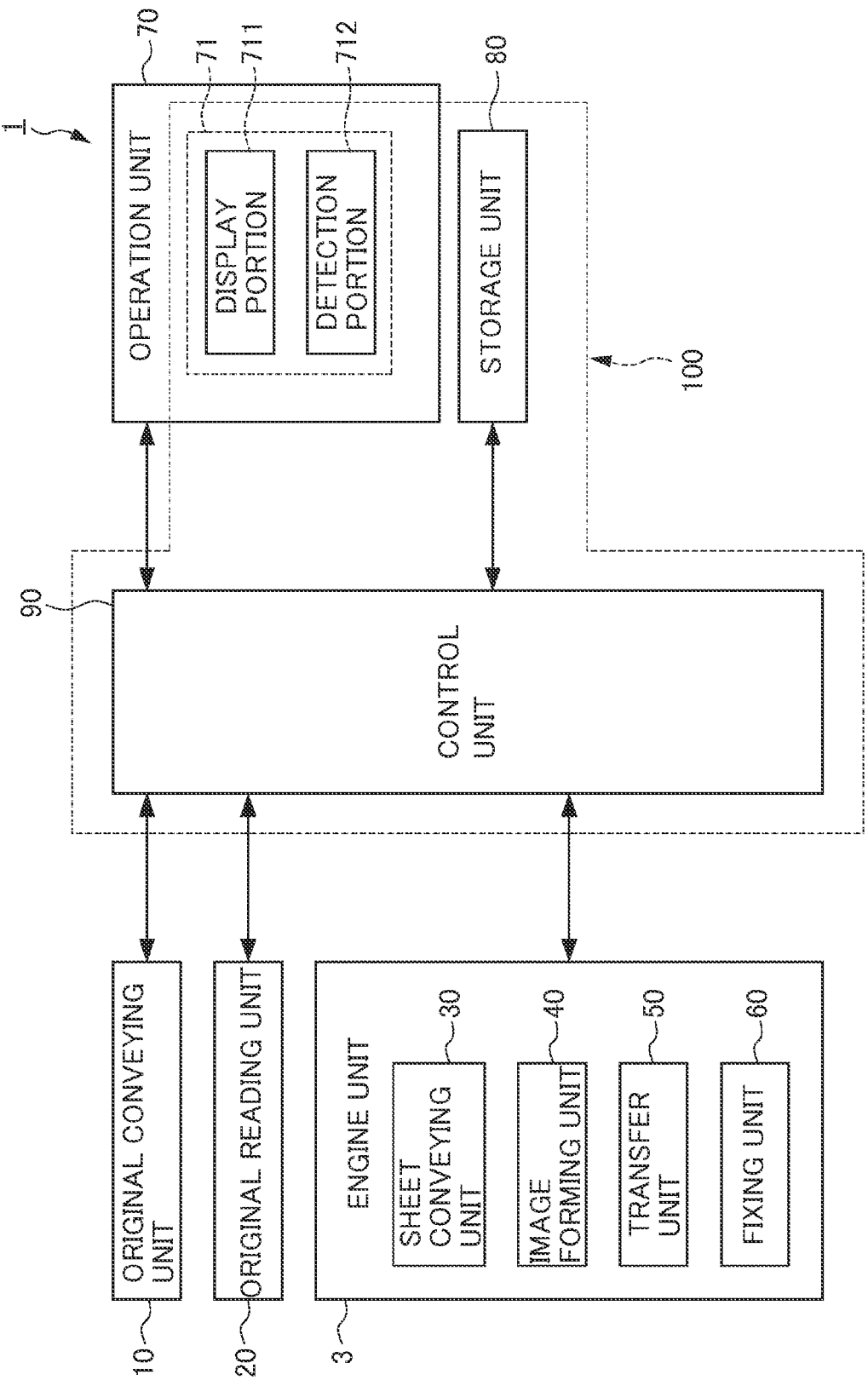
FIG. 2 is a block diagram showing a functional configuration of the copy machine.

Next, the functional configuration of the copy machine 1 will be described. FIG. 2 is a block diagram showing a functional configuration of the copy machine 1.

The copy machine 1 includes the above constituent elements (the original conveying unit 10, the original reading unit 20, the sheet conveying unit 30, the image forming unit 40, the transfer unit 50, and the fixing unit 60). An engine unit 3 is configured from the sheet conveying unit 30, the image forming unit 40, the transfer unit 50, and the fixing unit 60. Description of those constituent elements that have been described with reference to FIG. 1 will be omitted.

In addition to the abovementioned functional configuration, the copy machine 1 further includes an operation unit 70, a storage unit 80, and a control unit 90.

The operation unit 70 includes a touch screen 71, a numeric keypad (not shown), a start key (not shown), and the like. The touch screen 71 displays a plurality of keys or the like that are allocated to various functions (for example, a setting function for the copy magnification, a function for allocating a plurality of pages to a single sheet T (2in1) or the like). The keys displayed on the touch screen 71 are operated in order to execute any of the various functions on the copy machine 1. The numeric keypad is operated for input of numerals related to print copy number and the like. The start key is operated to execute printing. In response to operation of any of the keys, the operation unit 70 supplies a signal expressing operation of the key to the control unit 90.

The storage unit 80 is composed of a hard disk, a semiconductor memory, or the like. The storage unit 80 stores image data based on the original G read by the original reading unit 20. The storage unit 80 stores control programs used in the copy machine 1, and data used in relation to these control programs.

The control unit 90 controls the original conveying unit 10, the original reading unit 20, the engine unit 3, the operation unit 70 and the like.

Next, the information processing device 100 will be described. FIG. 3 is a diagram explaining order information stored in a storage unit.

As shown in FIG. 2, the information processing device 100 includes the touch screen 71, the storage unit 80, and the control unit 90. The touch screen 71 includes a display portion 711 and a detection portion 712.

The display portion 711 can display a plurality of icons 112 including first information. The icons 112 are buttons displayed on the display portion 711. The first information is information representing a function assigned to the icon 112. For example, for the icon 112 to which a function of selecting a size of original mounted on the original mounting unit 11 is assigned, the first information included therein is "Original Size".

The detection portion 712 detects contact by an object to the display portion 711. The object is a user's finger, a pen for input called stylus pen, or the like. Upon detection of contact by the object to the display portion 711, the detection portion 712 outputs location information representing a position of the contact by the object. The detection portion 712 can be a resistive film type, capacitance type, or the like.

The storage unit 80 further stores order information that associates information relating to the icon 112 to be displayed on the display portion 711 (icon information) and an order of displaying icons 112 on the display portion 711. The order information is used for displaying the icons 112 on the display portion 711 under a predetermined condition. The order information defines an order of displaying the icons 112 on the display portion 711. The order is defined in order from the icon 112 most likely selected by the user. In other words, a first place is set to the icon 112 of the highest priority. The icon information represents a function assigned to the icon 112 displayed on the display portion 711. For example, in a case shown in FIG. 3, a first place is set to "Magnification" in which a function of allowing the user to select copy magnification is assigned to the icon 112. A second place is set to "Duplex" in which a function of executing duplex printing is assigned to the icon 112. A third order is set to "Density" in which a function of allowing the user to select copy density is assigned to the icon 112.

In a case in which the detection portion 712 detects a contact by the object having a trajectory encircling at least one icon 112 displayed on the display portion 711 in a state in which the icons 112 are displayed on the display portion 711 in a first display mode, the control unit 90 displays the at least one icon 112 in a second display mode with a greater display area and displays the at least one icon in a central region of the display portion 711.

"A state in which the icons 112 are displayed on the display portion 711 in a first display mode" indicates displaying the icons 112 on the display portion 711 with a display area of an initial setting. A second display mode of the icons 112 indicates a case in which the display area of the icons 112 is enlarged by making perpendicular size and horizontal size of the icons 112 greater than those in the first display mode. A trajectory encircling the icon 112 is a trajectory of a circular shape, an oval shape, a rectangular shape or the like. The trajectory encircling the icon 112 also includes a trajectory partially encircling the icon 112, not only a trajectory encircling an entire icon 112. The trajectory partially encircling the icon 112 is, for example, a semicircle trajectory encircling the icon 112.

The information processing device 100 can thus change the display mode of the icon 112. In addition, the information processing device 100 can improve visibility and operability of the icon 112 viewed by a user.

The control unit 90 preferably displays the icon 112 in the second display mode along with second information. The second information is an explanation of the icon 112 in the second display mode. For example, in a case in which the icon "Paper Selection" is displayed in the second display mode, the control unit 90 includes an explanation corresponding to the icon "Paper Selection" (for example, "Change the paper supply cassette and select paper") in the icon.

The information processing device 100 can thus inform the user of the function assigned to the icon 112. As the information processing device 100 can further display the icon 112 as the second information inside the icon 112, visibility of the icon 112 can further be improved.

It is preferable that the control unit 90 detects the number of times the at least one icon 112 is encircled by the trajectory of the contact by the object to the display portion 711 and a direction of the trajectory based on a result of detection by the detection portion 712; and changes a magnification ratio of the icon 112 from the first display mode to the second display mode, based on the number of times and direction thus detected. The number of times encircled defines the magnification ratio. For example, in a case in which the icon 112 is encircled once (single trajectory), the control unit 90 sets the magnification ratio to 150%. In a case in which the icon 112 is encircled twice (double trajectory), the control unit 90 sets the magnification ratio to 200%. The direction of the trajectory defines whether the display area of the icon 112, which is displayed on the display portion 711 in the first display mode, is enlarged or reduced. For example, in a case in which the direction of the trajectory is a clockwise direction, the control unit 90 controls to enlarge the display area of the icon 112 displayed on the display portion 711 in the first display mode.

The information processing device 100 can thus set the display area of the icon 112 to a desired size for each user. The information processing device 100 can thus improve visibility of the icon 112.

In a case in which the detection portion 712 detects a contact having a trajectory encircling at least one icon 112 displayed on the display portion 711 in a state in which the icons 112 are displayed on the display portion 711 in the first display mode, the control unit 90 displays other icons 112 in the second display mode with a greater display area and displays the at least one icon 112 in a third display mode with a smaller display area on the display portion 711. For example, in a state in which the icons 112 "Original Size", "Paper Selection" and "Mixed Size Originals" are displayed on the display portion 711 in the first display mode, if a trajectory encircles the icon "Paper Selection", the control unit 90 displays the icons "Original Size" and "Mixed Size Originals" on the display portion 711 with the display area enlarged at a predetermined magnification ratio. In addition, the control unit 90 displays the icon "Paper Selection" on the display portion 711 with the display area reduced at a predetermined reduction ratio.

The information processing device 100 can thus reduce the display area of the icon 112 that is of lower priority for the user and expand the display area of the icon 112 that is of higher priority for the user.

The information processing device 100 can thus improve visibility and operability of the icon 112.

It is preferable that the control unit 90 detects the number of times the at least one icon 112 is encircled by the trajectory of the contact by the object to the display portion 711 and a direction of the trajectory based on a result of detection by the detection portion 712; and changes a reduction ratio of the icon 112 from the first display mode to the third display mode, based on the number of times and direction thus detected. The number of times encircled defines the reduction ratio. For example, in a case in which the icon 112 is encircled once (single trajectory), the control unit 90 sets the reduction ratio to 75%. In a case in which the icon 112 is encircled twice (double trajectory), the control unit 90 sets the reduction ratio to 50%. The direction of the trajectory defines whether the display area of the icon 112, which is displayed on the display portion 711 in the first display mode, is enlarged or reduced. For example, in a case in which the direction of the trajectory is a counterclockwise direction, the control unit 90 controls to reduce the icon 112 displayed on the display portion 711 in the first display mode.

The information processing device 100 can thus set the display area of the icon 112 to a desired size for each user.

In a case in which the detection portion 712 detects a contact by the object having a trajectory encircling at least one icon 112 displayed on the display portion 711 in a state in which the icons 112 are displayed on the display portion 711 in the first display mode, deletes the at least one icon 112 from the display portion 711 and displays a predetermined icon additionally on the display portion based on the order information (see FIG. 3) stored in the storage unit 80.

For example, in a state in which the icons 112 "Original Size", "Paper Selection" and "Mixed Size Originals" are displayed on the display portion 711 in the first display mode, if a trajectory encircles the icon "Paper Selection", the control unit 90 does not display the icon "Paper Selection" on the display portion 711. In addition, the control unit 90 refers to the order information (see FIG. 3) stored in the storage unit 80, identifies the icon information "Magnification" that is set to the first place in the order information, and displays the icon 112 corresponding to the icon information "Magnification" (the icon 112 to which a function of changing a magnification ratio is assigned) on the display portion 711. In a case in which the trajectory encircles two icons 112, the control unit 90 identifies the icon information that is set to the first and second place in the order information and displays the icons 112 corresponding to the icon information on the display portion 711.

The information processing device 100 can thus clear the icon 112 of lower priority for the user from the display portion 711. As the information processing device 100 displays the icons 112 on the display portion 711 based on the order information, the icons 112 that are more likely selected by the user are displayed on the display portion 711. In other words, the information processing device 100 can display the icons 112 according to the user's request.

Next, operation of the information processing device 110 according to the present embodiment will be described.

Figure 4:
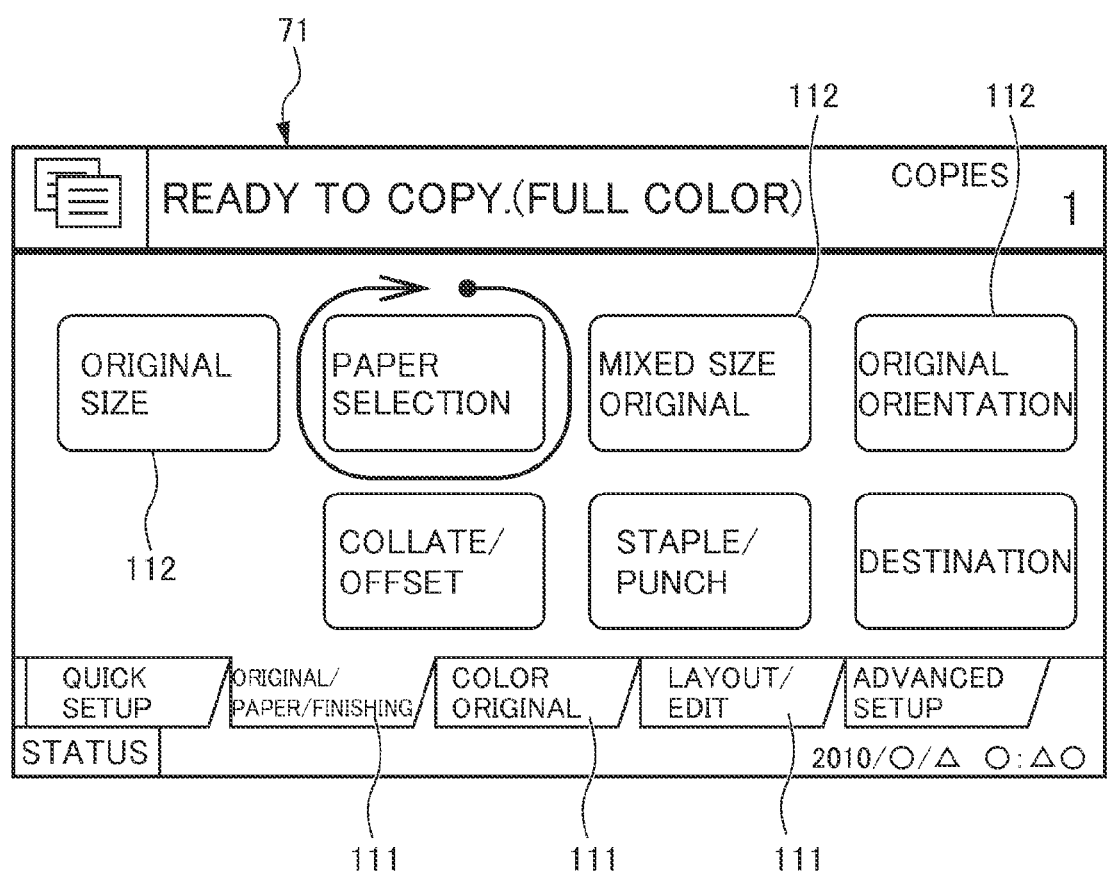
FIG. 4 is a first diagram explaining a window displayed on a touch screen.
Figure 5:
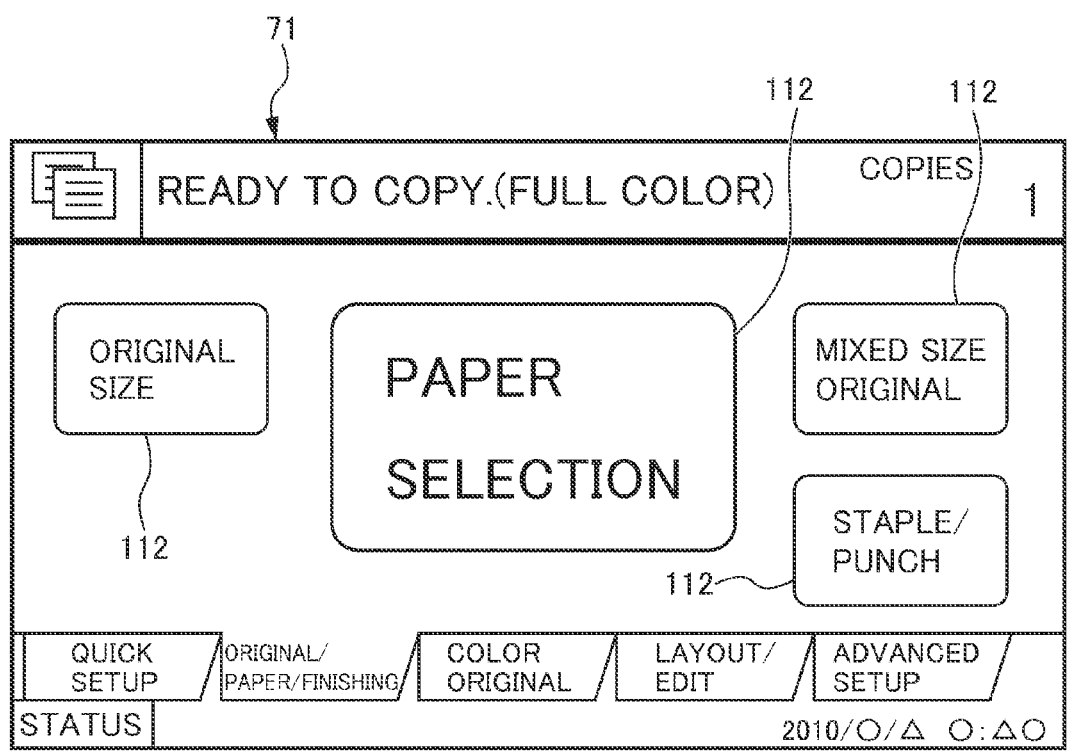
FIG. 5 is a second diagram explaining a window displayed on a touch screen.
Figure 6:
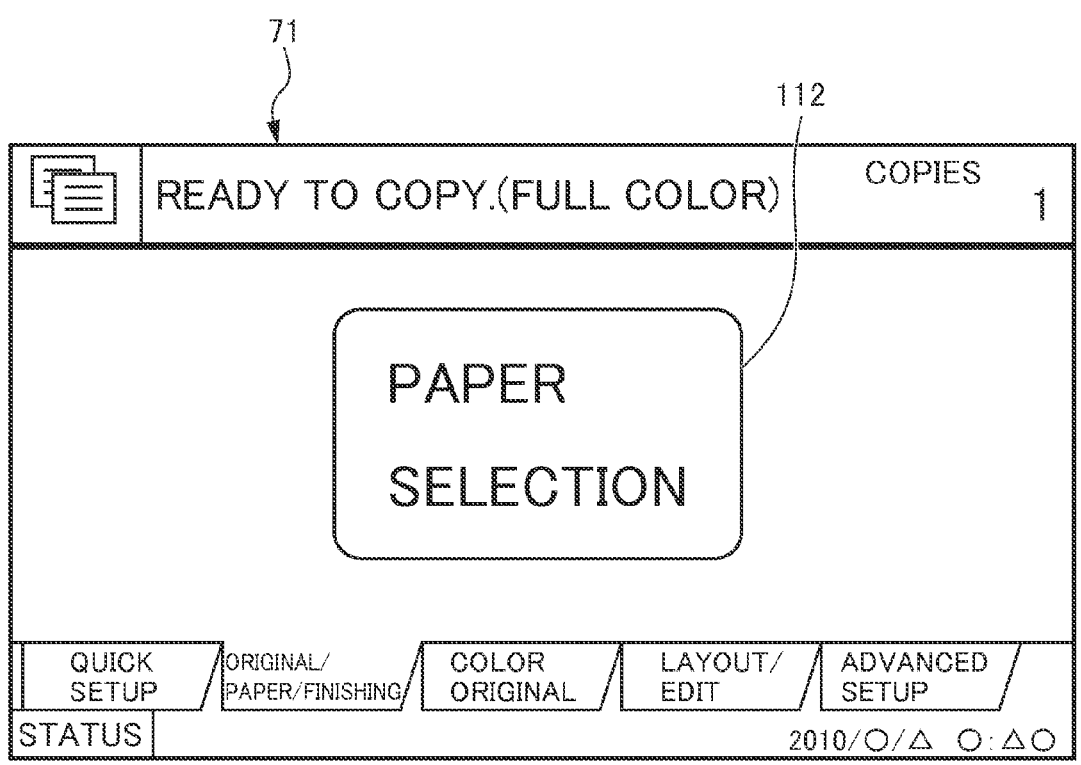
FIG. 6 is a third diagram explaining a window displayed on a touch screen.

First, a first operation of the information processing device 100 is described. FIG. 4 is a first diagram explaining a window displayed on the touch screen 71. FIG. 5 is a second diagram explaining a window displayed on the touch screen 71. FIG. 6 is a third diagram explaining a window displayed on the touch screen 71.

As shown in FIG. 4, a plurality of tabs 111 is displayed on the touch screen 71 (display portion 711) under control of the control unit 90. A plurality of icons 112 are assigned to each tab 111. The icons 112 assigned to the selected tab 111 are displayed on the touch screen 71. In FIG. 4, since a tab "Original/Paper/Finishing" is selected, icons "Original Size", "Paper Selection", "Mixed Size Originals", "Orientation of Original", "Collate/Offset", "Staple/Punch", "Paper Output" that are assigned to the tab 111 are displayed on the touch screen 71 under control of the control unit 90. As described above, in a case in which at least one icon 112 is displayed on the touch screen 71 and the user's finger or the like touches the touch screen 71 to make a trajectory encircling the icon 112, the detection portion 712 outputs the location information of the finger or the like touching the touch screen 71 to the control unit 90.

If the location information is input from the detection portion 712, the control unit 90 detects a trajectory made by the finger or the like based on the location information. In other words, the control unit 90 determines whether the detected trajectory is a trajectory of a round, oval, rectangular shape or the like that can encircle the icon 112 and also determines whether the trajectory is in a clockwise direction or counterclockwise direction. The control unit 90 also identifies the icon 112 encircled by the trajectory (icon "Paper Selection" in FIG. 4) based on the location information and location information of the icons 112 displayed on the touch screen 71. The location information of the icon 112 is stored in, for example, the storage unit 80.

Upon detection of a trajectory of a clockwise direction and identification of the icon 112, the control unit 90 displays the identified icon 112 on the touch screen 71 (display portion 711) with a display area enlarged at a predetermined magnification ratio. On the other hand, upon detection of a trajectory of a counterclockwise direction and identification of the icon 112, the control unit 90 displays the identified icon 112 on the touch screen 71 (display portion 711) with a display area reduced at a predetermined reduction ratio. In a case of displaying the identified icon 112 that is enlarged or reduced on the touch screen 71, the control unit 90 displays the identified icon 112 in a central part of the touch screen 71.

In FIG. 4, the control unit 90 detects a trajectory in a clockwise direction and identifies the icon "Paper Selection". In this case, as shown in FIG. 5, the control unit 90 enlarges the display area of the icon "Paper Selection" at a predetermined magnification ratio and displays the icon "Paper Selection" in a central part of the touch screen 71.

Upon detection of the trajectory and identification of the icon 112, the control unit 90 can display only the identified icon 112 on the touch screen 71. For example, upon detection of a trajectory of a clockwise direction and identification of the icon "Paper Selection", the control unit 90 displays only the identified icon "Paper Selection" in the central part of the touch screen 71 with a display area enlarged at a predetermined magnification ratio. On the other hand, upon detection of a trajectory of a counterclockwise direction and identification of the icon 112, the control unit 90 displays only the identified icon 112 on the touch screen 71 with a size reduced at a predetermined reduction ratio.

Figure 7:
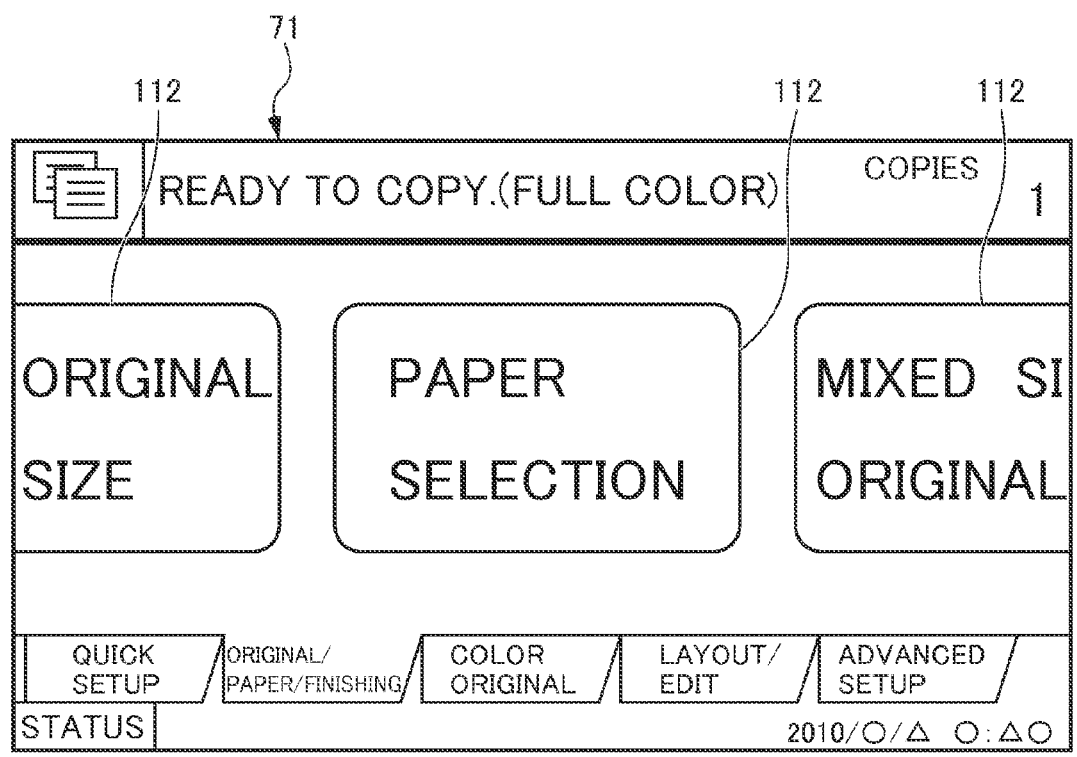
FIG. 7 is a fourth diagram explaining a window displayed on a touch screen.

Next, a second operation of the information processing device 100 is described. FIG. 7 is a fourth diagram explaining a window displayed on the touch screen 71.

Upon detection of the trajectory and identification of the icon 112, the control unit 90 can display the identified icon 112 and other icons 112, which are enlarged or reduced, on the touch screen 71. For example, upon detection of the trajectory and identification of the icon "Paper Selection", the control unit 90 enlarges the identified icon "Paper Selection" and icons "Original Size" and "Mixed Size Originals" that are arranged adjacently to the icon "Paper Selection" at the same magnification ratio, and displays these icons 112 on the touch screen 71 with the icon "Paper Selection" in the center. On the other hand, upon detection of a trajectory of a counterclockwise direction and identification of the icon 112, the control unit 90 displays the identified icon 112 and other icons 112 on the touch screen 71 with the display area reduced at the same reduction ratio.

Figure 8:
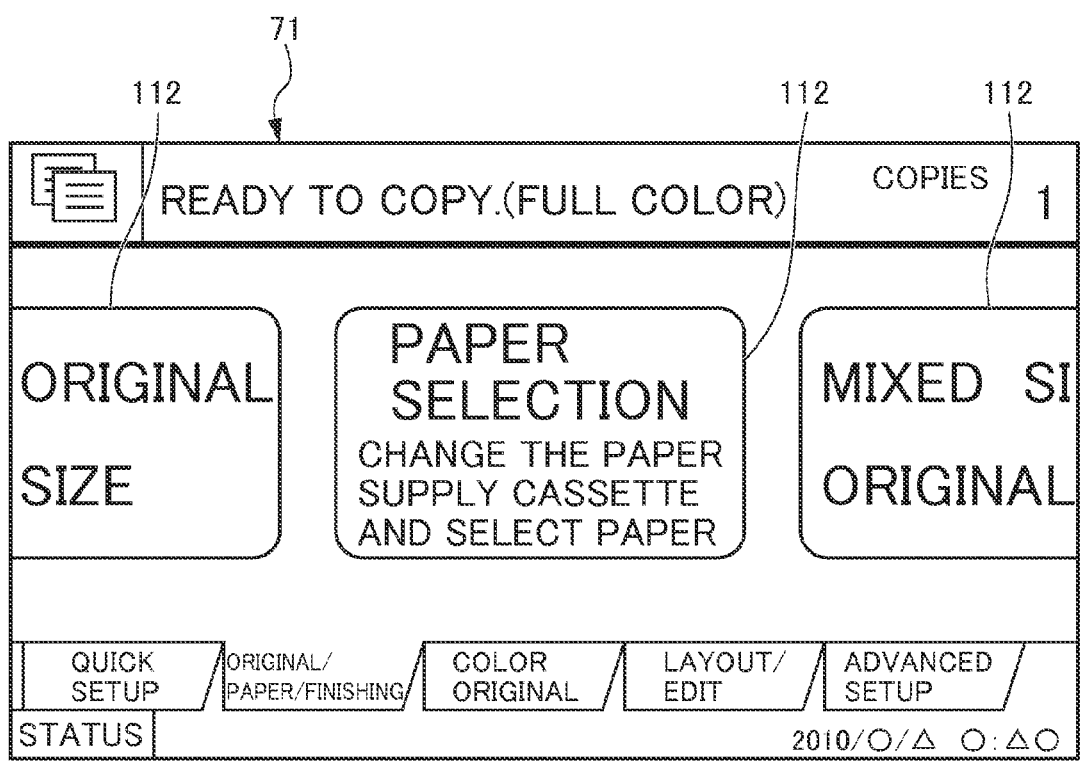
FIG. 8 is a fifth diagram explaining a window displayed on a touch screen.
Figure 9:
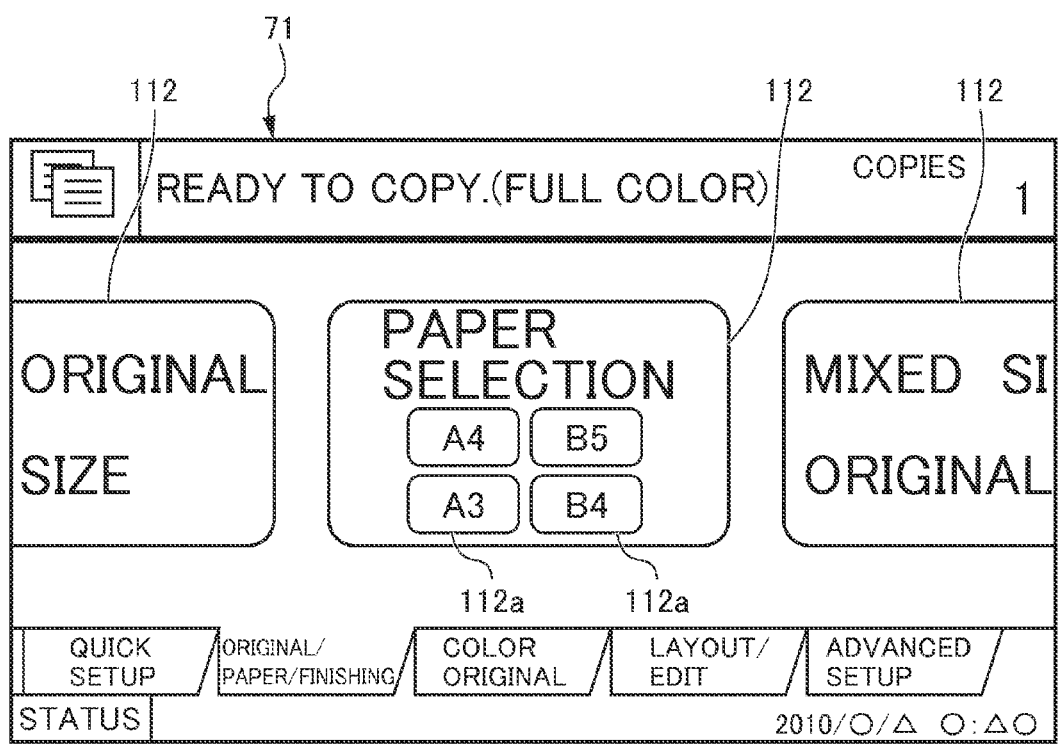
FIG. 9 is a sixth diagram explaining a window displayed on a touch screen.

Next, a third operation of the information processing device 100 is described. FIG. 8 is a fifth diagram explaining a window displayed on the touch screen 71. FIG. 9 is a sixth diagram explaining a window displayed on the touch screen 71.

In a case in which the control unit displays the enlarged icon 112 on the touch screen 71 as a result of detection of the trajectory in a clockwise direction and identification of the icon, it is preferable that the control unit 90 includes the second information inside the identified icon 112. The second information can be, for example, an explanation of the identified icon 112. More specifically, upon detection of the trajectory in a clockwise direction and identification of the icon "Paper Selection" as in the above-described example, the control unit 90 reads the explanation corresponding to the icon "Paper Selection" from the storage unit 80. Here, the explanation corresponding to the icon "Paper Selection" is stored in the storage unit 80 in advance. In addition, the control unit 90 displays the icon "Paper Selection" enlarged at a predetermined magnification ratio on the touch screen 71, while including the explanation corresponding to the icon "Paper Selection" ("Change the paper supply cassette and select paper") inside the icon "Paper Selection".

In addition, the control unit 90 can display the icon 112 additionally, as the second information. As icons 112a that are disposed inside the icon "Paper Selection", icons for paper sizes such as "A4", "A3", "B5", "B4" and the like can be exemplified. The icons 112a for paper sizes preferably represent sizes of paper stored in sheet cassettes. More specifically, upon detection of the trajectory in a clockwise direction and identification of the icon "Paper Selection" as in the above-described example, the control unit 90 reads sizes of paper stored in the sheet cassettes 36 from a setting unit (not illustrated) in which a user sets the paper size or from a paper size sensor (not illustrated) provided in the sheet cassettes. In addition, as shown in FIG. 9, the control unit 90 displays the icon "Paper Selection" enlarged at a predetermined magnification ratio on the touch screen 71, while including the icons for paper sizes "A4", "A3", "B5" and "B4" that are thus read inside the icon "Paper Selection". In this case, if the icon "A4" is selected by the user, the control unit 90 sets the size of the paper on which an image is formed to A4.

In the above-described example, the trajectory made by the user's finger or the like is a single trajectory. However, the trajectory made by the user's finger or the like can also be a double trajectory or more. In this case, the control unit 90 can detect how many times the trajectory encircles the icon, based on a result of detection by the detection portion 712. In addition, the control unit 90 can change the magnification ratio or the reduction ratio of the identified icon 112 based on the number of encirclement of the trajectory. For example, in a case of a single trajectory in a clockwise direction, the control unit 90 sets the magnification ratio of the specific icon 112 to 150%. In a case of a double trajectory in a clockwise direction, the control unit 90 sets the magnification ratio of the specific icon 112 to 200%. In a case of a single trajectory in a counterclockwise direction, the control unit 90 sets the reduction ratio of the specific icon 112 to 75%. In a case of a double trajectory in a counterclockwise direction, the control unit 90 sets the reduction ratio of the specific icon 112 to 50%.

Figure 10:
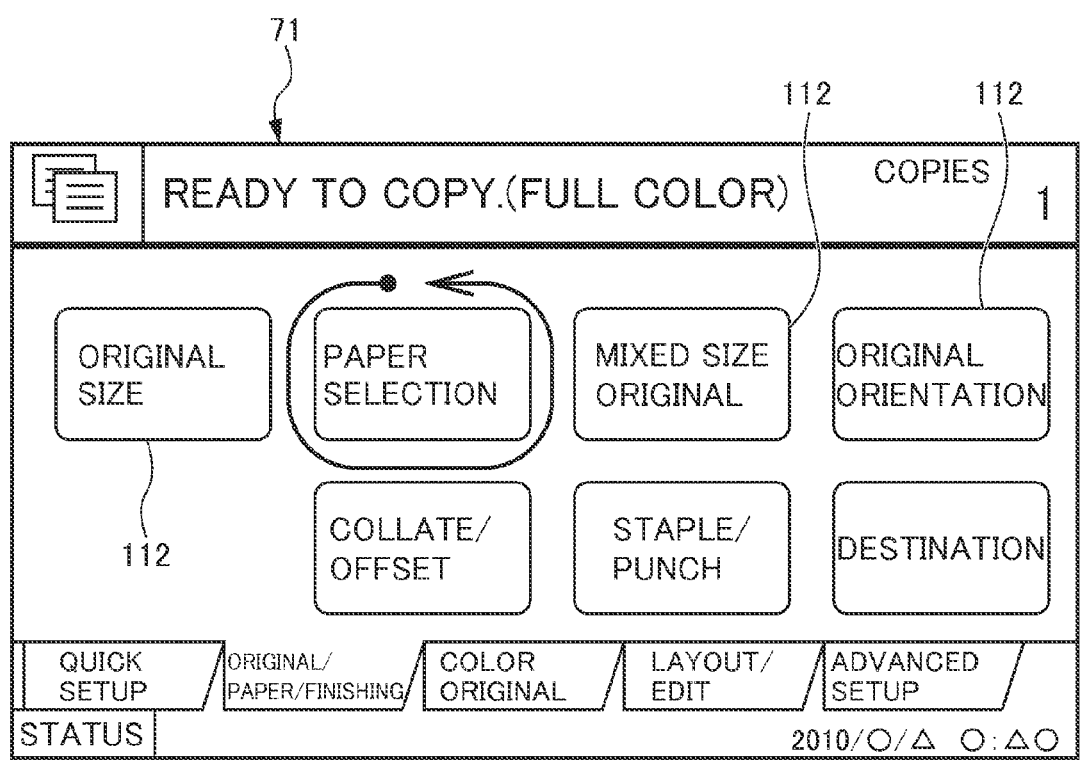
FIG. 10 is a seventh diagram explaining a window displayed on a touch screen.
Figure 11:
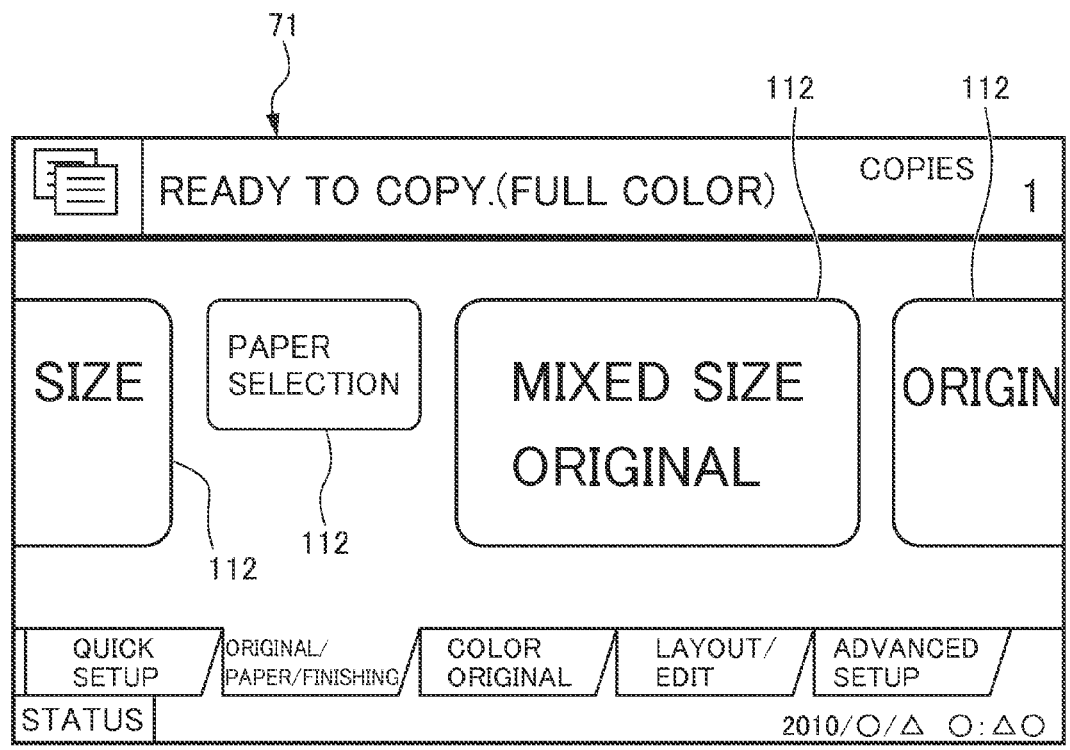
FIG. 11 is an eighth diagram explaining a window displayed on a touch screen.

Next, a fourth operation of the information processing device 100 is described. FIG. 10 is a seventh diagram explaining a window displayed on the touch screen 71. FIG. 11 is an eighth diagram explaining a window displayed on the touch screen 71.

As described above, upon detection of a trajectory in a counterclockwise direction encircling the at least one icon 112 based on a result of detection by the detection portion 712, the control unit 90 displays the icon 112 encircled by the trajectory on the touch screen 71 with the display area reduced at a predetermined reduction ratio. In this case, the control unit 90 preferably displays the other icons 112, which are different from the icon 112 encircled by the trajectory, with the display area enlarged at a predetermined magnification ratio on the touch screen 71.

For example, in a case in which the icon "Paper Selection" is encircled by a trajectory in a counterclockwise direction (see FIG. 10), the control unit 90 identifies the icon "Paper Selection" encircled by the trajectory based on a result of detection by the detection portion 712. The control unit 90 displays the icon "Paper Selection" on the touch screen 71 with the display area reduced at a predetermined reduction ratio (see FIG. 11). In addition, the control unit 90 displays the other icons 112, which are different from the icon 112 encircled by the trajectory (for example, "Original Size", "Mixed Size Originals", "Original Orientation" and the like), with the display area enlarged at a predetermined magnification ratio on the touch screen 71 (see FIG. 11).

Figure 12:
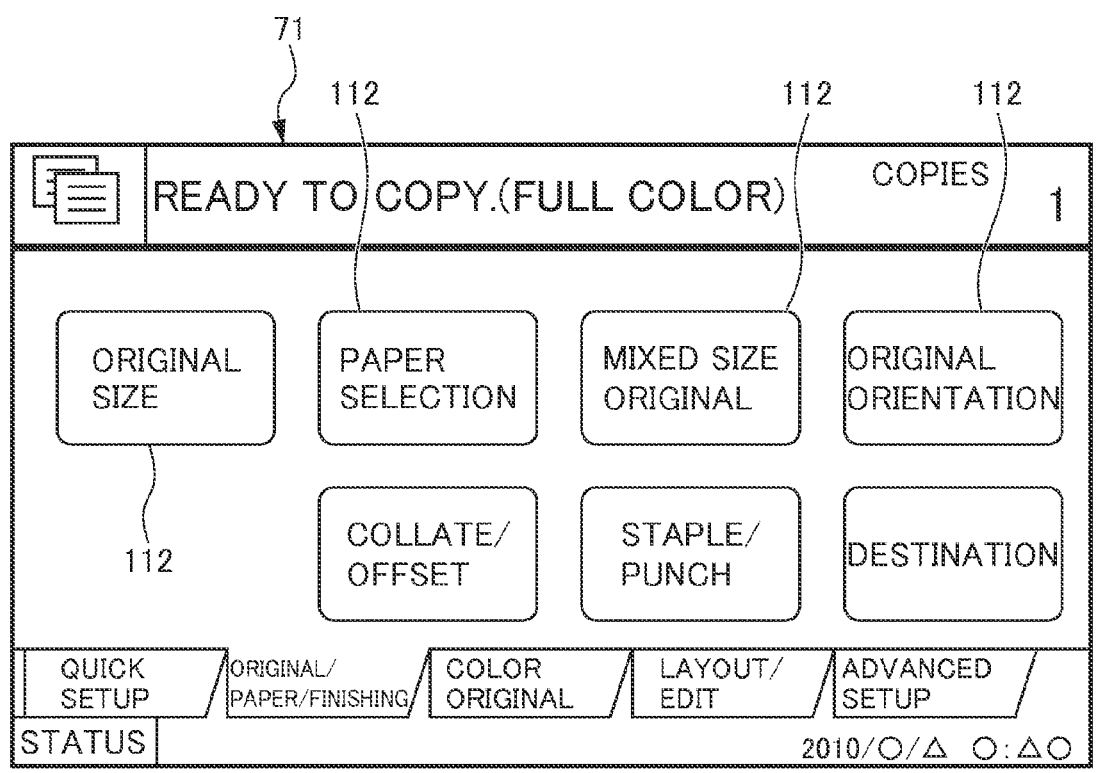
FIG. 12 is a ninth diagram explaining a window displayed on a touch screen.

Next, a fifth operation of the information processing device 100 is described. FIG. 12 is a ninth diagram explaining a window displayed on the touch screen 71.

Upon detection of a trajectory in a counterclockwise direction encircling the at least one icon 112 based on a result of detection by the detection portion 712, the control unit 90 can clear display of the icon 112 encircled by the trajectory from the touch screen 71. In this case, the control unit 90 can identify pieces of icon information of a number corresponding to the icons 112 that are cleared, in an order of displaying on the display portion 711 based on the order information stored in the storage unit 80, and can display the icon 112 corresponding to the icon information thus identified on the display portion 711.

For example, in a case in which the icon "Paper Selection" is encircled by a trajectory in a counterclockwise direction (see FIG. 10), the control unit 90 identifies the icon "Paper Selection" encircled by the trajectory based on a result of detection by the detection portion 712. The control unit 90 clears display of the icon "Paper Selection" from the touch panel 71. Thereafter, the control unit 90 identifies pieces of icon information of a number corresponding to the number of icons 112 that are cleared from the display portion 711, with reference to the order information stored in the storage unit 80 (see FIG. 3). In this example, as the icon "Paper Selection" is cleared from the display portion 711, the control unit 90 identifies the icon information "Magnification" that is set to a first place in the order information. The control unit 90 then displays the icon "Magnification" corresponding to the icon information "Magnification" thus identified (see FIG. 12). In other words, the control unit 90 displays the icon 112, to which a function of changing magnification is assigned, on the display portion 711.

Furthermore, the present disclosure is not limited to the abovementioned embodiment and can be carried out in various modes.

In the present embodiment, a configuration in which the information processing device 100 is installed in a copy machine has been described. However, the information processing device 100 of the present disclosure can also be installed in electronic devices such as an automatic teller machine, an automatic vendor, an automatic ticketing machine, a cellular phone, a portable digital assistant, a digital game machine, a portable audio player, a car navigation machine and the like.

In addition, in the above-described embodiment, a configuration in which: the icon 112 that is enlarged is displayed on the display portion 711 if a trajectory of contact by the object on the display portion 711 is in a clockwise direction; and the icon 112 that is reduced in display area is displayed on the display portion 711 if a trajectory of contact by the object on the display portion 711 is in a counterclockwise direction has been described. However, the information processing device 100 of the present disclosure can also be configured such that: the icon 112 that is reduced in display area is displayed on the display portion 711 if a trajectory of contact by the object on the display portion 711 is in a clockwise direction; and the icon 112 that is enlarged is displayed on the display portion 711 if a trajectory of contact by the object on the display portion 711 is in a counterclockwise direction.

Although the copy machine 1 according to the present embodiment is a color copy machine; however there is no limitation to this configuration, and it may be a monochrome copy machine.

The copy machine 1 according to the present embodiment transfers a toner image onto paper sheet T via the intermediate transfer belt 48 (indirect transfer configuration); however there is no limitation to this configuration, and the toner image formed by the photoreceptor drum may be directly transferred onto the paper sheet T (direct transfer configuration).

The copy machine 1 according to the present embodiment is configured to print on one side of the paper sheet T. However there is no limitation to this configuration, and double-sided printing of the sheet may be executed.

The image forming apparatus according to the present disclosure is not limited to the copy machine 1 described above. In other words, the image forming apparatus according to the present disclosure may relate to a multifunction peripheral combining a copying function, a facsimile function, a printer function, and a scanning function, or may be a facsimile or a printer.

Furthermore the transfer medium onto which the toner image is fixed by the image forming apparatus according to the present disclosure is not limited to a paper sheet T, and may include for example, a plastic sheet for an OHP (overhead projector) sheets, or the like.

What is claimed is:

1. An information processing device comprising:
   a display portion that can display a plurality of icons including first information;
   a detection portion that detects a contact to the display portion;
   a control unit that, in a case in which the detection portion detects a contact having a trajectory encircling at least one icon of the plurality of icons in a state in which the plurality of icons are displayed on the display portion in a first display mode, displays other icons not encircled by the trajectory in a second display mode with a greater display area than the first display mode on the display portion, and displays the at least one icon encircled by the trajectory in a third display mode with a smaller display area than the first display mode on the display portion, wherein the control portion displays the other icon in the second display mode and the at least one icon in the third display mode simultaneously on the display portion.

2. The information processing device according to claim 1, wherein the control unit:
   detects the number of times the at least one icon is encircled by the trajectory of the contact to the display portion and a direction of the trajectory based on a result of detection by the detection portion; and
   changes a magnification ratio of the at least one icon from the first display mode to the third display mode, based on the number of times and direction thus detected.

3. The information processing device according to claim 1, wherein the display portion and the detection portion compose a touch screen.

4. An image forming apparatus comprising the information processing device according to claim 1.

* * * * *